July 13, 1954
J. B. LITTLE ET AL
2,683,676
PRODUCTION OF GERMANIUM RODS HAVING
LONGITUDINAL CRYSTAL BOUNDARIES
Filed Jan. 13, 1950
2 Sheets-Sheet 1
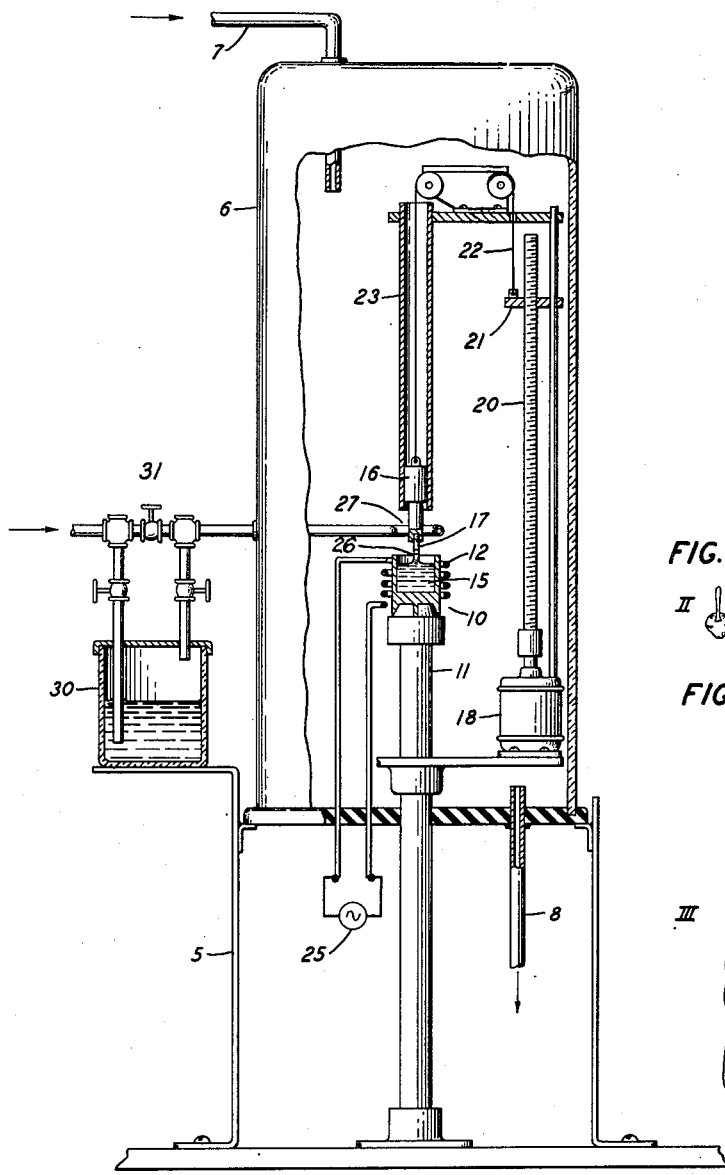
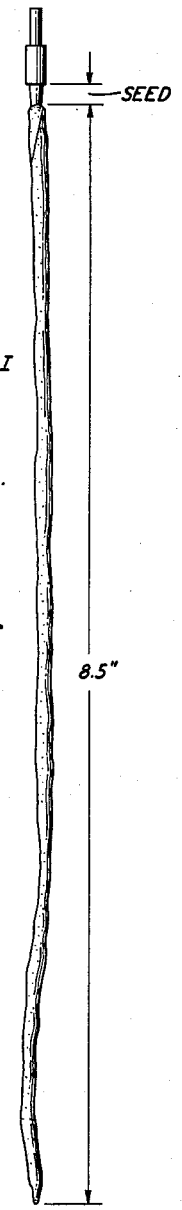
INVENTORS: J. B. LITTLE
G. K. TEAL
BY
*D. MacKenzie*
AGENT

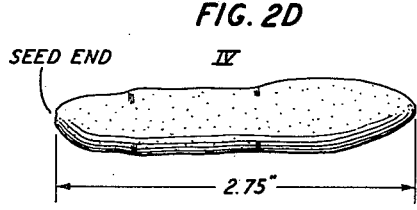
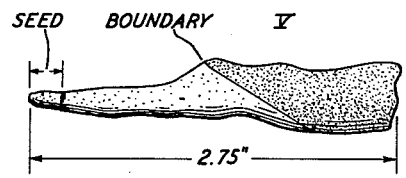
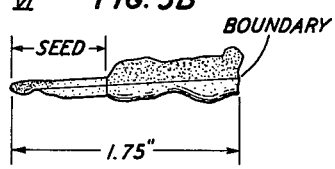
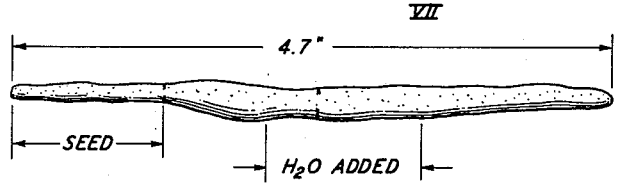
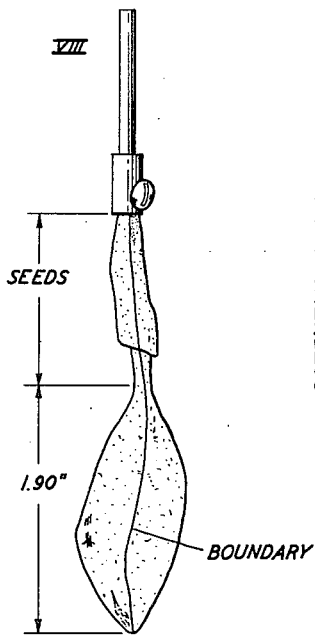
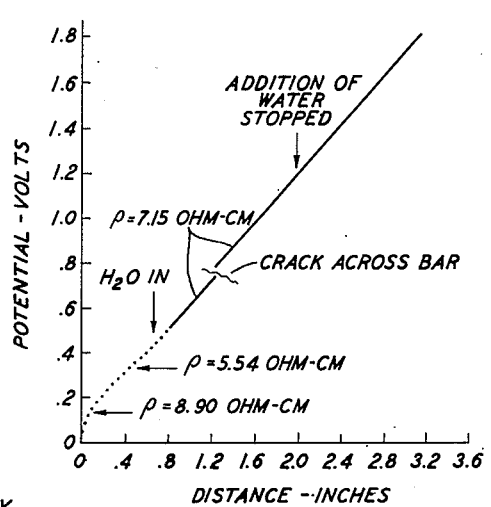
INVENTORS: J. B. LITTLE
G. K. TEAL

Patented July 13, 1954

2,683,676

UNITED STATES PATENT OFFICE 2,683,676

PRODUCTION OF GERMANIUM RODS HAVING LONGITUDINAL CRYSTAL BOUNDARIES

John B. Little and Gordon K. Teal, Summit, N. J., assignors to Bell Telephone Laboratories, Incorporated, New York, N. Y., a corporation of New York Application January 13, 1950, Serial No. 138,354

3 Claims. (Cl. 148—1.5)

This invention relates to an improved method and apparatus for producing single crystals, or controlled polycrystals, particularly of germanium. The method is generally applicable to other metals, but the practical and theoretical importance of semiconductors, especially germanium, in rectifiers, transistors, and the like, makes it most desirable to be able to produce single crystals of germanium of controlled characteristics, and this is made possible by the present invention.

The crystals themselves are claimed in our copending application Serial No. 197,219, filed October 14, 1950, entitled "Germanium Single Crystals" and forming a division of the present application.

An object of the invention is, therefore, to make possible the procurement of single germanium crystals of uniform character throughout and of chosen crystal orientation.

Another object of the invention is to provide a method of producing filamentary single crystals of germanium with controlled enlargements as desired.

Broadly stated, the method of the invention involves the drawing of crystals from molten germanium in the form of rods, of various lengths and diameters, by partly immersing in the melt a seed crystal of germanium and slowly withdrawing it vertically therefrom through an annular jet of hydrogen or hydrogen and water vapor; instead of these gases, one may use an inert gas, such as helium or helium with suitable additions of water vapor.

Germanium is a semiconductor which may be p-type or n-type, depending on whether the electrical conduction is by "holes" or by electrons. These conduction agents may recombine, thereby giving rise to a lifetime of holes and electrons, which lifetime is technically important in many of the applications of the semiconductor. A feature of the crystals produced by this invention is that the lifetimes of holes in n-type material and of electrons in p-type material have been found to be markedly longer than in germanium made by other known methods.

Germanium is an element extremely sensitive to mechanical and thermal disturbances, which usually produce twinning in crystals obtained by cooling from the molten condition. Accordingly, another object of the invention is to provide germanium in single crystals cooled from a melt with substantially complete avoidance of strains during solidification, and showing a high degree of crystal perfection or controlled imperfection.

Germanium even of the highest purity now available contains impurities which determine its character as p-type or n-type semiconductor, and when the liquid phase is progressively depleted in the growth of the solid phase, the concentration of these impurities in the remaining liquid increases, with the result that the character of a large crystal varies progressively as the crystal grows. It is found that this effect can be counter-balanced by introducing in the neighborhood of the liquid-solid interface an annular jet of hydrogen saturated with water vapor, and this is a feature of the invention. Instead of hydrogen, helium may be used.

An important reduction of base resistance in transistors has been found to result if the semiconductor has a grain boundary extending through its whole thickness and electrically in contact with the base plate but emergent on the other side at a point between the emitter and the collector and close to the latter. The present invention, by the use of two seed crystals of different orientations side by side, enables one to draw an extended rod having a grain boundary throughout its length, and certain of these boundaries have been shown to be npn junctions.

Thus, another object of the invention is to provide a method of producing germanium crystals with controlled grain boundaries. The utilization of such boundaries in signal translating devices is disclosed and claimed in the copending application of R. J. Kircher, "Semiconductor Signal Translating Devices," filed June 9, 1949, Serial No. 98,008, now Patent No. 2,623,103.

How the above objects are attained and the nature of the invention will be apparent from the following description, referring to the accompanying drawing, in which:

Fig. 1 is a diagram in vertical diametral section of one form of apparatus illustrative of the invention;

Figs. 2A, 2B, 2C and 2D show single crystals of germanium obtained from the apparatus of Fig. 1;

Figs. 3A, 3B, and 3C illustrate crystals produced in accordance with this invention and containing boundaries;

Fig. 4 shows a rod crystal of which part was drawn through a jet of hydrogen and water vapor; and Fig. 5 is a plot of electrical measurements on the rod of Fig. 4.

In Figs. 2A, 2B, 3A, 3B, 3C and 4, the crystal dimensions are indicated.

Referring to Fig. 1, stand 5 supports bell jar 6 through which hydrogen or any desired gas may be passed, entering at inlet 7 and emerging at outlet 8. Through bell jar 6 may be viewed the apparatus for melting and drawing the germanium. This apparatus comprises graphite crucible 10 surmounting post 11 and surrounded by water-cooled coils 12 traversed by a high frequency current, which heats by induction crucible 10 and its contents 15, consisting of buttons or ingots of high purity germanium. One way of preparing the germanium is by reduction from germanium oxide, melting the germanium in a suitable atmosphere or in vacuum depending on the semiconductive type desired, and allowing the metal to solidify in the graphite crucible in which it was melted. Treatment in vacuum produces p-type material; in a helium atmosphere containing a trace of water vapor, n-type material results. A suitable procedure is that disclosed and claimed in the application of J. H. Scaff and H. C. Theuerer, "Preparation of Germanium Rectifier Material," filed October 27, 1948, Serial No. 56,742, now Patent No. 2,576,267.

Above crucible 10 travels vertically the weight 16 to which is fastened (by a screw not shown) the seed crystal 17 of germanium. Weight 16 moves upward when motor 18 is started. Motor 18 rotates to turn threaded shaft 20, drawing downward traveling nut 21 and with it wire 22, which passes over pulleys, as shown, to raise weight 16 along the axis of tube 23.

The germanium mass 15 to be melted is placed in crucible 10, the bell jar is lowered into position and flushed with nitrogen to replace air. Hydrogen at the rate of about 100 cubic feet per hour then flows through the apparatus. Source 25 of high frequency current is turned on and heats crucible 10 by induction. It is important to make the frequency high enough to avoid visible agitation from induced currents reaching through the crucible into the germanium mass. Frequencies as low as 350,000 cycles have been used successfully. Mass 15 is melted and is kept at a temperature above its melting point long enough for the establishment of thermal equilibrium throughout crucible and melt. By appropriate operation of motor 18, seed 17 is lowered into the melt to a depth of a millimeter or so. A portion of the seed is melted to relieve any strains in the seed, and the molten metal is lifted by surface tension to embrace the solid part of the seed, and thermal equilibrium is established. Motor 18 is then operated to raise seed 17 at a rate of approximately 0.19 inch per minute. This is found to be, with the conditions of an actual case, substantially the rate at which molten germanium crystallizes as seed 17 and adherent column 26 of liquid germanium are withdrawn from the melt.

As column 26 is lifted, jets of hydrogen are played on it through orifices in ring 27, cooling the region of the liquid-solid interface. Through ring 27, the hydrogen flows at about 3 cubic feet per hour. The hydrogen of the cooling jets may be saturated with water vapor by passing through distilled water in jar 30; the hydrogen may be taken directly from a tank (not shown) or through jar 30 by manipulation of valves 31.

For the parts of the apparatus, convenient dimensions are: bell jar 6, 9 inches diameter, 24 inches height; crucible 10, $1\frac{7}{8}$ inches high, outside diameter $1\frac{1}{2}$ inches, inside diameter $1\frac{5}{32}$ inches; tube 23, inside diameter $\frac{3}{4}$ inch. A shallower crucible 1 inch high, $1\frac{1}{2}$ inches outside diameter, 1 inch inside diameter, with an inside depth of $\frac{5}{8}$ inch, has also been used.

It is to be noted that as the rising crystal forms, its weight is supported by the tension of wire 22. Thus, whatever the length and diameter of column 26, no stress is exerted by it on the melt from which it is being drawn, and it is substantially free from radial stress. The germanium crystallizes without constraint in any direction.

Rods of germanium drawn in the manner above described have been of small or large diameter and, respectively, long or short. One of each type (I and IV, respectively) is shown in Figs. 2A and 2D. Rod I is a long single crystal of substantially uniform diameter, while rods II and III are examples of rods drawn with controlled enlargements. Rod II is a short fine filament with terminal button-like enlargement; rod III is a portion of a rod of generally filamentary form with several enlarged portions; in each case, rod diameter is controlled as explained below.

It is found that the diameter of the rod is controllable by varying the flow of hydrogen through ring 27, Fig. 1; increasing (or decreasing) the flow increases (or decreases) the rod diameter from that initially established. The diameter may also be controlled by varying the temperature of the melt, the flow of hydrogen through the jets being constant; the higher the temperature of the melt, the smaller the diameter of the rod.

Illustrative of the control of rod diameter are the following approximate data: at a given melt temperature, if a $\frac{1}{8}$ inch rod is formed in hydrogen flow of five cubic feet per hour from ring 27, a $\frac{1}{2}$ inch rod will be formed when the hydrogen flow is tripled; if at a given melt temperature and a given flow the rod diameter is $\frac{1}{8}$ inch, raising the melt temperature 5° C. will reduce the diameter to $\frac{1}{16}$ inch.

In the case of rod I, Fig. 2A, some twinning of the crystal is shown adjacent to the seed, which was itself a single crystal; this effect is due to allowing insufficient time for the establishment of thermal equilibrium between seed and melt before starting to draw the rod, and is evidence of the great sensitiveness of germanium to the conditions under which it solidifies from a melt.

A twin boundary between two single crystals, even when the seed is a single crystal, may result from unequal peripheral cooling of the rod in the hydrogen jet. This may be avoided by rotating the rod as it is drawn, at the risk of introducing mechanical strains, or by rotating the jet with the attendant complication of the apparatus. It can also be avoided by using the shallower crucible, where the volume of graphite in the high frequency field is large compared to the volume of germanium in the crucible.

The crystalline orientation of the seed determines that of the drawn rod, and this control makes it easy to draw a rod of a desired orientation by suitably preparing the seed. This may be done by cutting from a larger single crystal a seed presenting at right angles to its length the selected orientation as determined by X-ray examination.

Boundaries in a rod between two or more single crystals side by side, can be purposely produced by using two or more seed crystals, of different crystalline orientation, held side by side in weight 16 of Fig. 1. A germanium rod drawn by such a multiple seed will preserve the boundaries throughout its length.

Fig. 3A shows as rod V a compound crystal with a twin boundary appearing in the course of drawing with a single seed. Fig. 3B shows as rod VI a crystal boundary produced in the rod by growth from a double seed of which the two parts are in atomic contact. Fig. 3C shows as rod VIII a crystal boundary grown from two single crystal seeds in mechanical contact. The usefulness of such boundaries in transistors has been previously alluded to herein. Obviously one may so use a larger number of seeds and produce a polycrystalline rod comprising a plurality of boundaries.

It has been mentioned that the hydrogen cooling jet may be saturated with water vapor. Fig. 4 shows rod VII, of which the middle portion was drawn in such a composite cooling atmosphere. It is a single crystal 3.5 inches long. Measurements of resistivity of this crystal are plotted on the curve of Fig. 5.

The first part of rod VII, drawn without water vapor, is represented by the dotted portion of the curve of Fig. 5, where for a current of one milliampere in the rod, voltage between the seed end and successive points along the length of the rod is plotted. The points at which water vapor was added and ceased to be added are indicated, as well as resistivity computed from the curve at intervals of rod length. This was a single germanium crystal, heated at 600° C. for 16 hours in a helium atmosphere before the electrical measurements. The local resistivity varied from 3.5 ohm-centimeter at the seed end, rising to 8.9 ohm-centimeter 0.1 inch from the seed and then decreasing to 5.5 ohm-centimeter at 0.4 inch for the seed. Water vapor was added at 0.8 inch and stopped at 2.0 inches. It will be observed that the resistivity, which had become 7.1 ohm-centimeter at 0.6 inch, remains at this value to the end of the rod, although the water vapor was absent for the last 1.5 inch of the rod. This continuance of the effect is due to the water lingering in the bell jar and so continuing to bathe the material.

It is clear that the composite atmosphere of hydrogen and water vapor enables one to prepare a single germanium crystal of uniform resistivity and of uniformity in other properties as well.

As to semiconductor type, the rods vary with the origin of the germanium melt, that is, with the portion cut from the original ingot and melted in the graphite crucible of Fig. 1. The predominance of one or the other type (donor or acceptor) impurity in the melt determines the formation of n-type or p-type rods, or variation in type for a given rod in different regions. It is, of course, possible to add to the melt either a donor impurity from the fifth column of the periodic table or an acceptor impurity from the third column, if n-type or p-type rods, respectively, are desired; germanium itself being an element of the fourth column. The semiconductor type of the seed crystal appears not to determine the type of the rod thereby drawn.

The control of rod diameter previously described makes it possible to produce single crystals of germanium with enlargements at intervals of their lengths or with a single button-like enlargement at the end of a crystal otherwise of filamentary form. In certain applications of single crystals of semiconductor material such as germanium, a filament ending in a button has been found desirable form.

It will be observed that the crystals prepared according to the invention are throughout their growth wholly free of mechanical or thermal constraint and the progressively solidifying material is of mass small in comparison to that of the melt from which it is drawn. For germanium ingots of high purity, a reducing atmosphere as herein illustrated is suitable during the process of melting the ingot and drawing rod crystals therefrom. Depending on the composition of the ingot, an inert or even an oxidizing atmosphere may be desirable; the function of the atmosphere is to control the chemical condition as required.

What is claimed is:

1. The method of preparing a rod of germanium composed of a plurality of crystals of different orientations with intervening longitudinal boundaries which comprises placing a mass of germanium in an inert atmosphere, replacing the inert atmosphere with a flow of a reducing atmosphere, melting the mass in the reducing atmosphere, maintaining the melt at a temperature above the melting point, placing a plurality of seed crystals of germanium having different crystalline orientations in longitudinal contact with each other, placing the adjoined seed crystals in immersed contact with the melt, progressively lifting from the melt the seed crystals together with the molten germanium adherent thereto, and cooling to solidification the adherent germanium in an independent flow of the reducing atmosphere, the lifting being at a rate substantially the same as that of crystallization of the adherent germanium.

2. The method of claim 1 in which the reducing atmosphere is hydrogen.

3. The method of claim 2 including the step of varying the independent flow to control the transverse dimension of the rod.

References Cited in the file of this patent

UNITED STATES PATENTS

| Number | Name | Date |
| --- | --- | --- |
| 1,531,784 | Hazelett | Mar. 31, 1925 |
| 1,738,307 | McKeehan | Dec. 3, 1929 |
| 1,921,934 | Lewis | Aug. 8, 1933 |
| 2,091,903 | Baggett et al. | Aug. 31, 1937 |
| 2,188,771 | Welch | Jan. 30, 1940 |
| 2,402,582 | Scaff | Jan. 25, 1946 |

OTHER REFERENCES

"Physical Review," vol. 33, 1929, pages 81–85.

"Transactions of American Society for Treating Metals," vol. 42, 1950, pages 319–328, especially pages 321 and 322.